(12) United States Patent
Schopf

(10) Patent No.: US 7,392,596 B2
(45) Date of Patent: Jul. 1, 2008

(54) PROBE HEAD

(75) Inventor: Reinhold Schopf, Trostberg (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 28 days.

(21) Appl. No.: 11/512,834

(22) Filed: Aug. 29, 2006

(65) Prior Publication Data

US 2007/0062057 A1    Mar. 22, 2007

(30) Foreign Application Priority Data

Sep. 8, 2005 (DE) .................. 10 2005 042 557

(51) Int. Cl.
*G01B 5/012* (2006.01)
(52) U.S. Cl. ........................................... 33/559
(58) Field of Classification Search .............. 33/503, 33/559, 560, 561
See application file for complete search history.

(56) References Cited

U.S. PATENT DOCUMENTS

| | | | |
|---|---|---|---|
| 4,833,792 A * | 5/1989 | Aehnelt et al. ............ 33/558 |
| 5,090,131 A | 2/1992 | Deer | |
| 5,327,657 A | 7/1994 | Hajdukiewicz et al. | |
| 5,345,690 A | 9/1994 | McMurtry et al. | |
| 5,404,649 A * | 4/1995 | Hajdukiewicz et al. ....... 33/503 |
| 5,884,410 A * | 3/1999 | Prinz ...................... 33/559 |

FOREIGN PATENT DOCUMENTS

| | | |
|---|---|---|
| DE | 30 16 782 | 11/1980 |
| JP | 2002-267435 | 9/2002 |

* cited by examiner

*Primary Examiner*—G. Bradley Bennett
(74) *Attorney, Agent, or Firm*—Kenyon & Kenyon LLP

(57) ABSTRACT

A probe head includes sensors having, in each instance, a pressure-sensitive surface, electrical signal being producible by the sensors when pressure forces are acting. Furthermore, the probe head has mechanical transmission elements and a holding element for positioning the transmission elements with respect to the sensors. The holding element is fixed in a stationary manner relative to the sensors and is configured such that the transmission elements are movable relative to the sensors in a direction having a directional component orthogonal to the surface. Furthermore, the probe head includes a probe element, which is deflectable relative to the sensors. The probe element, the sensors and the transmission elements are arranged in a mechanical operative connection such that by contacting the probe element, a change in the level of the electrical signal is producible by at least one of the sensors.

12 Claims, 4 Drawing Sheets

PROBE HEAD

CROSS-REFERENCE TO RELATED APPLICATIONS

The present application claims priority to Application No. 10 2005 042 557.7, filed in the Federal Republic of Germany on Sep. 8, 2005, which is expressly incorporated herein in its entirety by reference thereto.

FIELD OF THE INVENTION

The present invention relates to a probe head, e.g., having pressure-sensitive sensors.

BACKGROUND INFORMATION

A probe system normally includes a mobile probe head and a stationary part. Such a probe head is often used in the form of a probe switch or a switching probe having a deflectable probe element which generates a switching signal in response to a deflection out of its rest position. Such probe heads are used particularly for determining the position of workpieces. These may be clamped into material-working machines, machine tools, for example. In this context, the rest position of the probe element or a stylus is understood as a position in which the stylus has no contact with the workpiece to be probed. When the stylus contacts the workpiece, the probe element is deflected from its rest position, even if only minimally, and an electrical signal is produced by a suitable transducer if the deflection or the force exerted on sensors in the probe head exceeds a specified threshold. The electrical signal is then frequently converted into an infrared signal such that a contactless and wireless signal transmission to the stationary part of the probe system is achieved in this manner.

A probe head of the kind mentioned above is described in European Published Patent Application No. 0 423 307, in which arms of a probe element or stylus holder cause deformations in the so-called seat elements when making probing contact, the deformations being measured and being able to trigger corresponding probe signals. For this purpose, the seat elements are arranged slanted or arched in diametrically opposed pairs. Such an arrangement is believed to have several disadvantages. For example, following repeated deflection of the probe element, a precise position of the introduction of force into the sensors cannot be ensured in a reproducible manner.

SUMMARY

Example embodiments of the present invention may provide a probe head that has an exceedingly exact and reproducible probe performance.

According to an example embodiment of the present invention, the probe head includes sensors, each having a pressure-sensitive surface. Under the influence of pressure forces, which have a directional component orthogonal to the pressure-sensitive surface, the sensors generate electrical signals. Pressure-sensitivity in this context particularly refers to a contact pressure emanating from another body. The probe head further includes mechanical transmission elements and a holding element. The latter is used for positioning the transmission elements relative to the position of the sensors and is fixed in a stationary manner relative to the sensors. The holding element is configured such that the transmission elements in one direction, which has a directional component orthogonal to the surface, are movable relative to the sensors. Furthermore, the probe head includes a probe element, which is movably supported relative to the sensors. The probe element, the sensors and the transmission elements are in a mechanical operative connection such that when deflecting or contacting the probe element—e.g., a stylus belonging to the probe element—a change in the level of the electrical signal of at least one of the sensors may be generated.

For example, the mechanical operative connection includes the probe element, the transmission elements and the sensors being arranged in a contacting manner such that pressure forces introduced by the probe element are transmitted into the sensors via the transmission elements. A transmission element may be arranged geometrically between one arm of the probe element and a sensor, the transmission element contacting both the respective arm of the probe element as well as the respective sensor in a rest position and/or a deflected position of the probe element.

The probe head or the mentioned operative connection may be arranged such that the pressure forces are directed substantially perpendicularly to the surface of the sensors.

Those surfaces of the transmission elements may be rounded off, which contact the pressure-sensitive surface of the sensors or the probe elements. The transmission elements may be arranged as spheres.

The pressure-sensitive surfaces of the sensors may be flat. That is, the sensors have a plane surface, which practically cannot apply any guide forces, which are directed parallel to this surface, onto the respective transmission element.

The probe head may be arranged such that in each instance one transmission element contacts no more than one sensor in the rest position and/or deflected position of the probe element. Since, in this type of construction, the forces introduced by the transmission element are not distributed to multiple sensors, maximum signal yield or sensitivity may be provided. It should be noted that precisely in the use of pressure-sensitive sensors, extremely small deflection movements normally result in a switching of the probe head. Accordingly, the rest position usually deviates little from the deflected position. Nevertheless, the probe element may be said to be deflectable with respect to the sensors because the probe element is movably supported with respect to the sensors.

The holding element, which is a separate or discrete component, may be centrosymmetric. This may provide achieving a uniform and direction-independent switching characteristic of the probe head. Because the holding element is quasi-ring-shaped makes, it may be extremely flexurally stiff in terms of the longitudinal axis of the probe element with respect to tangential and radial forces such that practically no deformations of the holding element result from forces directed in this manner, which is important for the exact positioning of the transmission elements relative to the position of the sensors. On the other hand, the holding element is comparatively flexurally soft in a direction parallel to the longitudinal axis of the probe element so as to allow for an axial movement of the transmission elements.

The transmission elements may be arranged on tabs of the holding element. The tabs are flexurally soft in a direction that has a directional component orthogonal to the surface of the sensors, e.g., perpendicular to the surface. Tabs should be understood as regions of the holding element that protrude or project. Accordingly, there are regions of the holding element, which are comparatively narrow and which ultimately provide the required flexural softness. Alternatively, the flexural softness may also be achieved by other measures. For example, the holding element may be perforated or slotted in order to weaken corresponding regions and thus make them flexurally soft, or the cross-section may be purposefully reduced or the flexurally soft region may also be made of a separate material.

The probe head may be configured such that at least one transmission element contacts at least one of the sensors in the rest position of the probe element. For example, a transmission element may be pressed onto at least one of the sensors in the rest position of the probe element by an elastic deformation of the holding element.

In general, when deflecting the probe element, which often has three arms offset by 120°, one arm transmits a pressure force and another arm transmits a pressure-relieving force onto the respectively associated transmission element. The holding element allows not only for the exact positioning of the transmission elements relative to the sensors, but at the same time provides a defined prestress or pressure force on the sensors, even when, for example, an arm of the probe element has lifted off the transmission element such that even in this state there is a contact between the transmission element and the probe element due to the particular arrangement of the holding element. Especially in highly sensitive sensors, this may provide that their pressure-sensitive surface is less exposed to wear or stress.

The probe head may be constructed such that the sensors are in a plane that is arranged perpendicular to the longitudinal axis of the probe element or of the stylus. For this purpose often three sensors offset by 120° are used, which are respectively equidistant with respect to the longitudinal axis of the probe element. A transmission element may be connected by an adhesive connection to the holding element. This prevents the respective transmission element from turning relative to the holding element and thus also relative to the respective surface of the sensors. This measure allows for the service life of the sensors to be extended or for comparatively sensitive and highly precise sensors to be used reliably.

According to an example embodiment of the present invention, a probe head includes: sensors, each sensor including a pressure-sensitive surface, the sensors adapted to produce electrical signals when pressure forces act that have a directional component orthogonal to the pressure-sensitive surface; mechanical transmission devices; a holding device adapted to position the transmission elements with respect to the sensors, the holding device fixed in a stationary manner relative to the sensors, the transmission elements movable relative to the sensors in a direction having a directional component orthogonal to the pressure-sensitive surface; and a probe device supported movably relative to the sensors. The probe element, the sensors and the transmission devices are arranged in a mechanical operative connection such that a contact of the probe element results in a change in a level of the electrical signals produced by at least one of the sensors.

The transmission devices may be arranged as spheres.

The pressure-sensitive surfaces of the sensors may be flat.

Each transmission device may be arranged to not contact more than one sensor in at least one of (a) a rest position and (b) a deflected position of the probe element.

The holding device may be centrosymmetric.

The holding device may be arranged as a one-piece component.

The transmission devices may be arranged on tabs of the holding device, and the tabs may be flexurally soft in a direction having a directional component orthogonal to the pressure-sensitive surface.

At least one transmission device may be arranged to contact at least one of the sensors in a rest position of the probe element.

At least one transmission device may be pressed onto at least one of the sensors by an elastic deformation of the holding device.

At least one transmission device may be connected to the holding device by an adhesive connection.

At least one transmission device may be adhesively connected to the holding device.

The sensors may be mounted on a circuit board.

The sensors may include piezoresistive silicon chips.

Further details and aspects of a probe head according to example embodiments of the present invention are described in more detail below with reference to the appended Figures.

DETAILED DESCRIPTION

Figure 1:
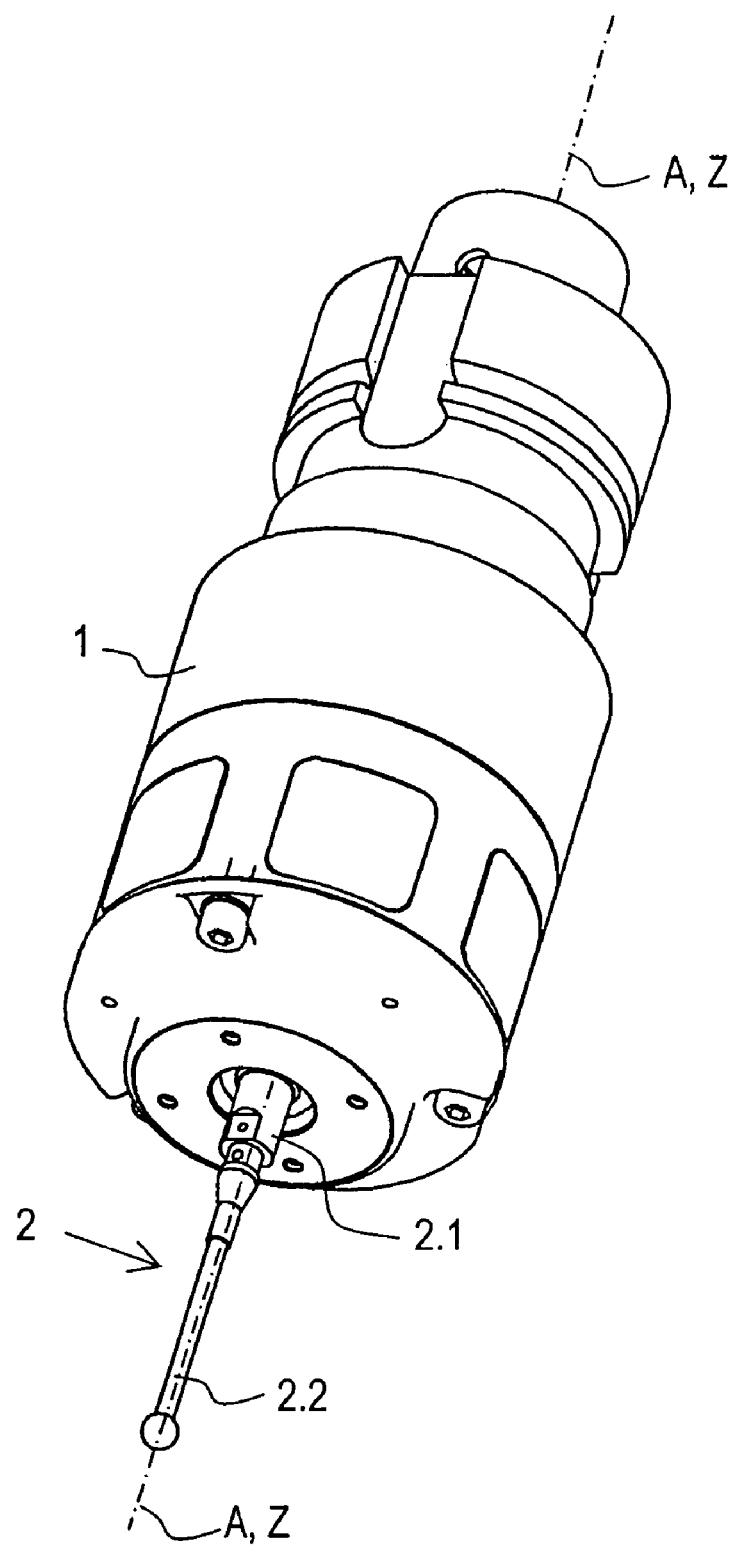
FIG. 1 is a perspective view of a probe head.

FIG. 1 is a perspective external view of a probe head. The probe head includes a housing 1 having a probe element 2 projecting from it. Probe element 2 has a longitudinal axis A, which in the rest state or in the rest position at the same time represents the longitudinal axis Z of housing 1. In the exemplary embodiment illustrated, probe element 2 includes two parts, e.g., a stylus holder 2.1 and a stylus 2.2, to which in FIG. 1 at the bottom a probing contact sphere is attached as a stylus end. Stylus 2.2 further has a rupture joint. Stylus holder 2.1 and stylus 2.2 are detachably connected to each other by a screw connection. Stylus holder 2.1 of probe element 2 has at one end three arms 2.11 offset by 120° (see, e.g., FIG. 6). Two parallel cylindrical members 2.111 are attached on the bottom side of each arm 2.11. On the radial outer ends of arms 2.11 there is in each case an offset.

Figure 2:
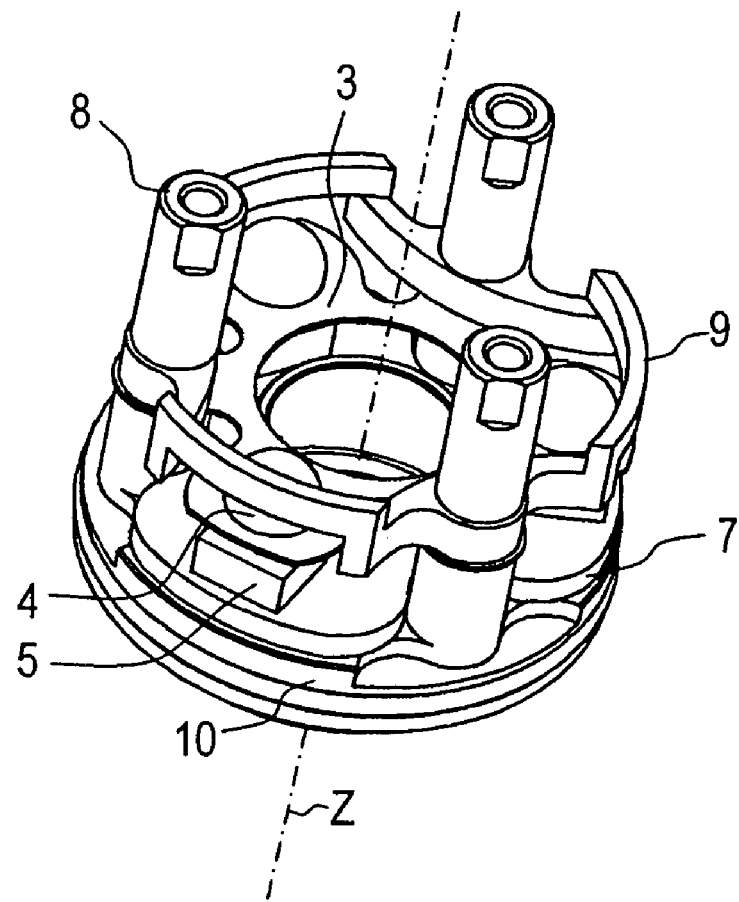
FIG. 2 is a perspective view of a measuring device in the probe head.
Figure 5:
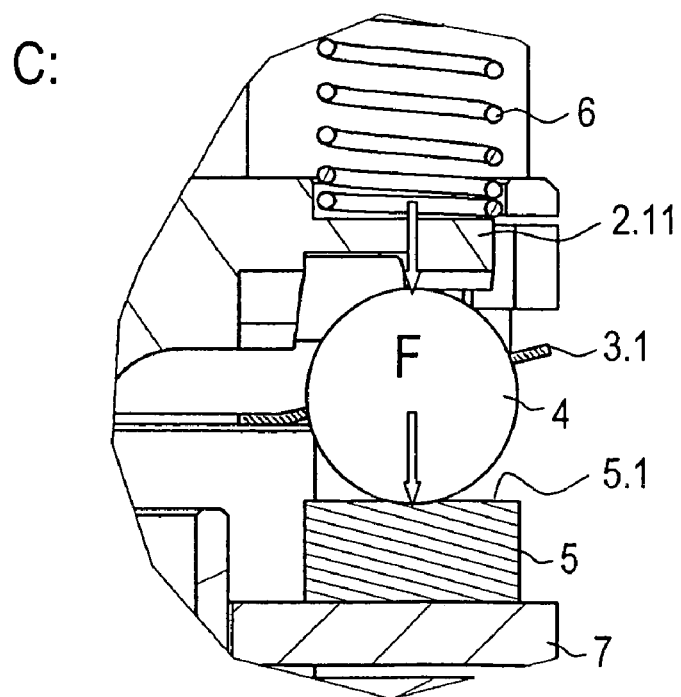
FIG. 5 is a detailed view of the measuring device of the probe head.

FIG. 2 illustrates a measuring device, as is arranged in the interior of housing 1. A circuit board 7, on which three sensors 5 are mounted, is located on a substantially disk-shaped base member 10. In the exemplary embodiment illustrated, pressure sensor elements are used as sensors 5, which are based on piezoresistive silicon chips. These sensors 5 have a pressure-sensitive surface 5.1 (see, e.g., FIG. 5), in which pn-insulated bridge resistors are arranged.

Spheres 4 rest on the surface 5.1 of each sensor 5, which are used as mechanical transmission elements. In order for spheres 4 to be always positioned exactly relative to sensors 5, a holding element 3 is provided, which is fixed in a stationary manner with respect to sensors 5.

Figure 3:
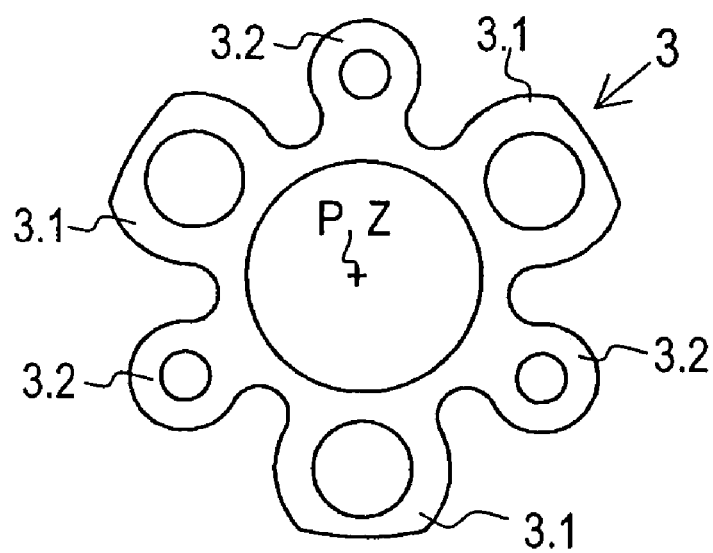
FIG. 3 is a top view of a holding element.

In a top view, FIG. 3 illustrates holding element 3, which, in the exemplary embodiment illustrated, is arranged as a separate one-piece component, e.g., as sheet metal having a thickness of, e.g., 0.25 mm. Holding element 3 has three tabs 3.1 offset by 120° along a circumferential line, having each one bore hole. The inner diameter of the bore hole is somewhat smaller than the outer diameter of spheres 4. Moreover, holding element 3 includes three additional tabs 3.2, which have bore holes. Holding element 3 is centrosymmetric with respect to a point P, which is, at the same time, the center point of a central bore hole.

Figure 4:
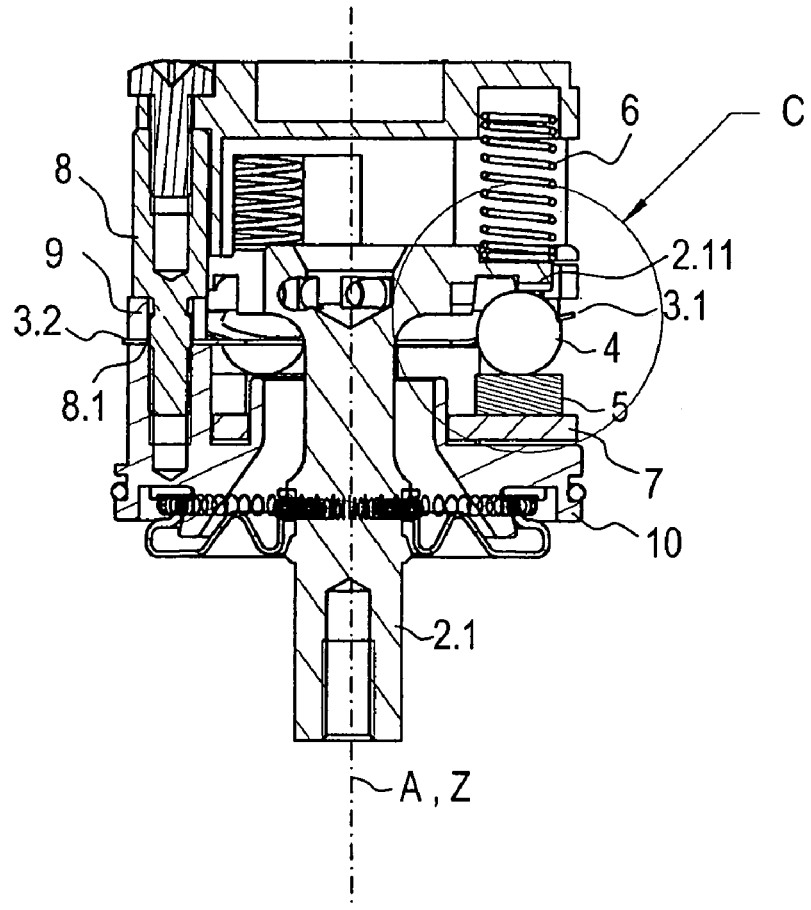
FIG. 4 is a partial cross-sectional view of the probe head.

FIG. 4 is a cross-sectional view of the probe head. In the assembly of the probe head, circuit board 7 having sensors 5 mounted on it is fixed with accuracy of fit on base member 10. Subsequently, spheres 4 are laid on surfaces 5.1 of sensors 5.

Holding element 3 is then arranged on spheres 4 such that the latter partially penetrate through the bore holes in tabs 3.1. Afterwards, bolts 8 are inserted through openings of a ring member 9 and through the bore holes of additional tabs 3.2 and screwed into an internal screw thread in base member 10. Since bolts 8 have highly accurately machined outer surfaces 8.1, which fit without play into the bore holes of additional tabs 3.2, holding element 3 and thus also spheres 4 are positioned exactly relative to the sensors in a plane perpendicular to the Z axis. But the positioning of spheres 4 occurs with accuracy of fit also in a direction parallel to the Z axis, since holding element 3 is pressed by its front side against a surface of base member 10. As a result, the comparatively thin holding element 3 is elastically deformed in the region of tabs 3.1 such that ultimately spheres 4 are pressed against sensors 5 at a defined contact force and are thus mounted without play. This provides that spheres 4 are constantly in contact with the respective surfaces 5.1 of sensors 5. An adhesive connection between spheres 4 and holding element 3 prevents the spheres from turning relative to holding element 3 and thus also relative to the respective surface 5.1 of sensors 5.

Figure 6:
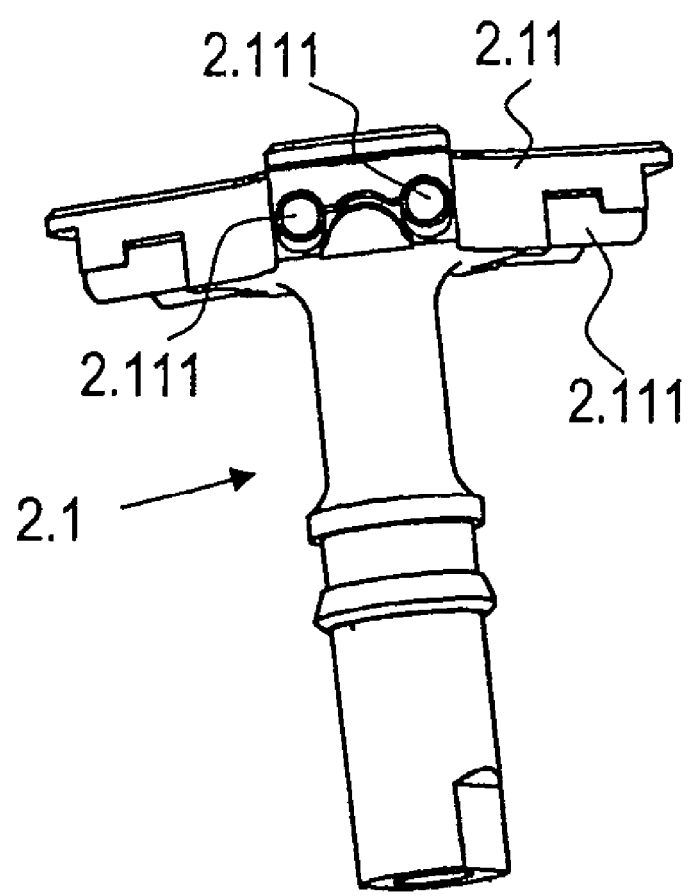
FIG. 6 is a detailed view of the stylus holder.

In the assembly of the probe head, stylus holder 2.1 of probe element 2, as it is illustrated in FIG. 6, is inserted through the central opening such that it ultimately rests on spheres 4. Arms 2.11 of stylus holder 2.1 are arranged on their bottom sides such that they have two parallel directed cylindrical members 2.111, whose clearance is smaller than the diameter of spheres 4. As a result, each sphere 4 comes to be located between a pair of these cylindrical members 2.111. Stylus holder 2.1 is preloaded by springs 6 and is then mounted movably relative to housing 1 and thus also relative to sensors 5.

In the measuring operation, the probe head travels, for example, within the machining space of a machine tool. As soon as the probing contact sphere contacts an obstacle—a workpiece to be measured, for example—the entire probe element 2 is deflected, even if slightly. The deflected or switching position is reached before an arm 2.11 of probe element 2 loses mechanical contact to the respective sphere 4. This prevents the formation of a direction-dependent switching characteristic. In the operation of the probe head, a supply voltage for supplying sensors 5 is introduced via circuit board 7. The contact of probe element 2 changes pressure forces F (see, e.g., FIG. 5), which act on sensors 5, which has the consequence of a change in the level of the electrical signal of at least one of sensors 5. The electrical signals are transmitted to another circuit board within housing 1 of the probe head where they are processed further in a suitable electronic circuit such that the respective switching signals are converted into electromagnetic signals, which are sent to a stationary receiver station.

The stationary receiver station is fixed in an immobile component of the machine tool, for example. From this stationary receiver station, the received signal is transmitted to electronics, for example, in the control system of the machine tool, where the position of the probing contact sphere is determined and at the same time the machine is stopped.

Since, in the exemplary embodiment illustrated, spheres 4 are used as a transmission mechanism, a nearly punctiform contact area is provided on the respective surface 5.1 of sensors 5. Accordingly, pressure forces F are directed perpendicularly or orthogonally to the respective surface 5.1, which results in an optimal signal yield or signal amplitude.

Holding element 3 provides that spheres 4 in each case rest reproducibly at the correct point on surface 5.1 of sensors 5. This is particularly significant if it is considered that the deflection signal is composed of all three individual signals of sensors 5, pressure force F being reduced for all sensors 5 or only for a partial number of sensors 5 when probe element 2, e.g., stylus 2.2, is contacted. The first case occurs, for example, if the workpiece to be measured is approached from a direction parallel to longitudinal axis A of probe element 2. Then, against the forces of springs 6, the three arms 2.11 of probe element 2 lift off possibly completely from spheres 4. Spheres 4, however, remain positioned without change relative to sensors 5 with the aid of holding element 3.

As soon as, following the probing contact, probe element 2 or stylus holder 2.1 returns to its rest position, the three arms 2.11 again rest exactly on spheres 4, the curvature of spheres 4 having an aligning or centering effect on probe element 2. The described type of construction thus creates a probe head, which reproducibly operates extremely exactly even after many probing contact operations.

What is claimed is:

1. A probe head, comprising:
   sensors, each sensor including a pressure-sensitive surface, the sensors adapted to produce electrical signals when pressure forces act that have a directional component orthogonal to the pressure-sensitive surface;
   mechanical transmission devices;
   a holding device adapted to position the transmission elements with respect to the sensors, the holding device fixed in a stationary manner relative to the sensors, the transmission elements movable relative to the sensors in a direction having a directional component orthogonal to the pressure-sensitive surface; and
   a probe device supported movably relative to the sensors;
   wherein the probe element, the sensors and the transmission devices are arranged in a mechanical operative connection such that a contact of the probe element results in a change in a level of the electrical signals produced by at least one of the sensors; and
   wherein the transmission devices are arranged on tabs of the holding device, the tabs being flexurally soft in a direction having a directional component orthogonal to the pressure-sensitive surface.

2. The probe head according to claim 1, wherein the transmission devices are arranged as spheres.

3. The probe head according to claim 1, wherein the pressure-sensitive surfaces of the sensors are flat.

4. The probe head according to claim 1, wherein each transmission device does not contact more than one sensor in at least one of (a) a rest position and (b) a deflected position of the probe element.

5. The probe head according to claim 1, wherein the holding device is centrosymmetric.

6. The probe head according to claim 1, wherein the holding device is arranged as a one-piece component.

7. The probe head according to claim 1, wherein at least one transmission device is arranged to contact at least one of the sensors in a rest position of the probe element.

8. The probe head according to claim 1, wherein at least one transmission device is pressed onto at least one of the sensors by an elastic deformation of the holding device.

9. The probe head according to claim 1, wherein at least one transmission device is connected to the holding device by an adhesive connection.

10. The probe head according to claim 1, wherein at least one transmission device is adhesively connected to the holding device.

11. The probe head according to claim 1, wherein the sensors are mounted on a circuit board.

12. The probe head according to claim 1, wherein the sensors includes piezoresistive silicon chips.

* * * * *